United States Patent [19]

Fletcher

[11] 4,425,459

[45] Jan. 10, 1984

[54] HIGH IMPACT POLY(P-METHYLSTYRENE)

[75] Inventor: Robert A. Fletcher, Houston, Tex.

[73] Assignee: Shell Oil Company, Houston, Tex.

[21] Appl. No.: 452,593

[22] Filed: Dec. 23, 1982

[51] Int. Cl.$^3$ ............................................. C08K 5/06
[52] U.S. Cl. .................................... 524/371; 525/71; 525/83; 525/99; 525/243; 525/316
[58] Field of Search .................. 525/99, 243, 316, 71, 525/83; 524/371, 412

[56] References Cited

U.S. PATENT DOCUMENTS

| | | | |
|---|---|---|---|
| 4,242,465 | 12/1980 | Canterino | 524/371 |
| 4,260,694 | 4/1981 | Schwab | 525/314 |
| 4,275,179 | 6/1981 | Sherman | 525/98 |
| 4,294,937 | 11/1981 | Whitehead | 525/99 |

FOREIGN PATENT DOCUMENTS 3405  1/1979  European Pat. Off.

*Primary Examiner*—J. Ziegler

[57] ABSTRACT

The impact strength of poly(p-methylstyrene) is improved by incorporating both a thermoplastic elastomer and a non-thermoplastic diene elastomer during the polymerization of the p-methylstyrene.

6 Claims, No Drawings

HIGH IMPACT POLY(P-METHYLSTYRENE)

BACKGROUND OF THE INVENTION

1. Field of the Invention

The present invention relates to styrenic polymers of improved impact strength, and in particular to polymers of p-methylstyrene wherein both a thermoplastic elastomer and a non-thermoplastic diene elastomer are incorporated during the polymerization.

2. Description of the Prior Art

Polymers derived from styrene have been commercially applied for many years, including the "high impact" modifications in which the impact strength is improved by incorporating a minor amount of a rubber during the polymerization. More recently, polymers derived from poly(p-methylstyrene) have been described, as has the production of "high impact" modifications of such polymers by the grafting of methylstyrene onto an elastomeric polymer backbone. See, e.g., U.S. Pat. Nos. 4,260,694 and 4,275,179 and European patent application No. 3405. However, there remains a continuing need to improve the impact resistance of p-methylstyrene polymers.

SUMMARY OF THE INVENTION

In one aspect, the invention relates to a high impact polymer comprising an interpolymer of:
(a) from about 75 to about 97% by weight of p-methylstyrene;
(b) from about 1 to about 10% by weight of a thermoplastic elastomeric block copolymer;
(c) from about 2 to about 15% by weight of a non-thermoplastic diene elastomer.

In a further aspect, the invention also relates to a process for preparing an impact improved styrenic polymer which comprises thermally polymerizing a solution of a thermoplastic elastomeric block copolymer and a non-thermoplastic diene elastomer dissolved in a monomer feed in which the sole polymerizable monomer component consists essentially of p-methylstyrene, the weight proportions of elastomers to monomer being about 3 to about 25 parts elastomer (combined), in, respectively, about 97 to about 75 parts monomer, at a temperature in the range of from about 90° C. to about 200° C., with agitation until the reaction mixture has undergone phase inversion, for a time sufficient to polymerize substantially all of the p-methylstyrene; and removing any residual monomer to yield an interpolymer containing discrete gelled rubber particles.

The compositions of the present invention have a high impact strength, and resulted from the discovery that including a thermoplastic elastomer in a diene elastomer p-methylstyrene interpolymerization yields a product having a significant improvement in impact strength, this improvement manifesting itself only if both elastomers are present during polymerization and not if the thermoplastic elastomer is physically blended into a pre-formed interpolymer. This discovery was unexpected because no such significant difference was observed between the products from interpolymerization and physical blending in comparable systems based on styrene polymers.

The compositions of this invention are of particular value in the production of ignition retardant products since their high impact strength helps to compensate for the reduction in impact strength brought about by the presence of the ignition retardant additives. Thus, yet a further aspect of the invention relates to an ignition retardant, high impact styrenic polymer composition comprising:

(1) an interpolymer of:
 (a) from about 75 to about 97% by weight of the interpolymer of p-methylstyrene;
 (b) from about 1 to about 10% by weight of the interpolymer of a thermoplastic elastomer;
 (c) from about 2 to about 15% by weight of the interpolymer of a non-thermoplastic diene elastomer; and
(2) from about 1 to about 50% by weight of the total composition of ignition retardant additives, suitably a mixture of a brominated diphenyl ether and antimony oxide.

DETAILED DESCRIPTION OF THE INVENTION

The styrenic polymer component (a) of the interpolymer of this invention is derived from the polymerization of p-methylstyrene; the presence of small amounts of other isomeric methylstyrenes is, however, not precluded. Thus, the p-methylstyrene need not be the pure para isomer, and in fact it is usually commercially impracticable to remove all the other isomers from the commercially available product. The monomer feed will, therefore, normally comprise a mixture of isomeric methylstyrene monomers rich in p-methylstyrene. Such mixtures suitably contain at least about 90%, preferably at least about 95%, by weight of p-methylstyrene and less than about 0.1% by weight of o-methylstyrene, the balance being m-methylstyrene, and may be prepared by catalytic dehydrogenation of the mixtures of ethyl toluenes obtained by the catalytic ethylation of toluene, for example, as described in U.S. Pat. No. 4,086,287, to which reference is made.

The non-thermoplastic diene elastomer used as component (c) in the preparation of the interpolymer may be any of such elastomeric materials well known for impact improvement of polystyrene. Thus, it may be derived from dienes such as butadiene or isoprene, which may be copolymerized with styrene to form vulcanizable, elastomeric copolymers such as styrene-butadiene. This elastomer is interpolymerized with the p-methylstyrene by dissolving the elastomer in the monomer feed and effecting polymerization of the resultant solution; in some situations it may be convenient to incorporate part of the rubber by physical blending with pre-formed interpolymer. The use, and types, of elastomer for impact improvement in polystyrene is well known in the prior art, see, e.g., U.S. Pat. No. 4,011,284, the contents of which are incorporated herein by reference, and, hence, do not require further elaboration.

The thermoplastic elastomer component (b) may be a linear ABA type block copolymer or a radial (AB)$_x$-BA block copolymer where x is greater than 1, each block A being a monoalkenyl arene polymer having an average molecular weight between about 5,000 and 45,000, each block B being an elastomeric conjugated diene polymer, or a hydrogenated derivative thereof, having an average molecular weight between about 15,000 and about 300,000, and said blocks A comprise 8–75% by weight of the copolymer. Preferably radial block copolymers are used in which x varies from over 1 to 15, more preferably from about 2 to about 6. A typical radial polymer would be one in which the diene block is derived from butadiene or a hydrogenated derivative thereof and has three or more branches, the tip of each branch being connected to a polystyrene block. See, e.g. U.S. Pat. No. 3,594,452. Other useful monoalkenyl arenes from which the thermoplastic (non-elastomeric) blocks may be formed include alphamethyl styrene, tertbutyl styrene and other ring alkylated styrenes as well as mixtures of the same. The conjugated diene monomer preferably has 4 to 5 carbon atoms, such as butadiene and isoprene.

The average molecular weights of each of the blocks may be varied as desired. The monoalkenyl arene polymer blocks preferably have number average molecular weights about 8,000 and about 30,000. The elastomeric conjugated diene polymer blocks preferably have number average molecular weights between about 25,000 and about 150,000. The average molecular weights of the polystyrene end blocks are determined by gel permeation chromatography, whereas the polystyrene content of the polymer is measured by infrared spectroscopy of the finished block polymer. The weight percentage of the thermoplastic monoalkenyl arene blocks in the finished block polymer should be between about 8 and 75%, preferably between about 20% and about 50% by weight. The general type and preparation of these block copolymers are described in U.S. Pat. No. Re. 28,246 and in many other U.S. and foreign patents. The amounts of the different elastomers used as components (b) and (c) are preferably such that the interpolymer contains from about 5 to about 10% by weight of the interpolymer of the non-thermoplastic polydiene elastomer, which is preferably polybutadiene, and up to about 5%, preferably from about 2 to about 3%, by weight of the interpolymer, of the thermoplastic elastomeric block copolymer.

The interpolymers of this invention may be prepared by using methods and reaction conditions well known in the art for the preparation of high impact polystyrene. Thus, they may be produced by mixing the non-thermoplastic diene and thermoplastic elastomers with the p-methylstyrene monomer in the desired proportions and initiating the polymerization. Best results are obtained when the elastomers are dissolved in the monomer prior to polymerization in a bulk polymerization process. The actual reaction conditions used to form the interpolymer are those well known in the art for the preparation of high impact polystyrene. Thus, the polymerization is generally thermally initiated, i.e., carried out in the absence of a catalyst. Coloring agents which are inert to the polymerization may also be added. The mixture is then subjected to conditions which will cause the p-methylstyrene to polymerize with the elastomers in a bulk process. Good results are obtained by heating the solution to a temperature of from about 90° C. to about 200° C. for a time sufficient to polymerize substantially all of the p-methylstyrene. Generally speaking, bulk polymerization for high impact compositions requires agitation for temperature control of the first polymerization stage and for proper dispersal of the rubbery material as it undergoes phase inversion, i.e., precipitates from the solution during this early polymerization step.

After the polymerization is complete the product may contain a small amount, e.g., about 1 to 2% of unpolymerized styrenic monomer. As the presence of monomer has an adverse affect on impact properties, this is preferably removed by any of the known methods for removing residual monomer. Such methods include, e.g., subjecting the interpolymer to vacuum, e.g., in a devolatilizing extruder.

Antioxidants, chain regulators, lubricants, and fillers inert to the reaction can also be added. Examples of suitable antioxidants include 2,6-di-tert-butyl-4-methylphenol and trisnonylphenylphosphite, which may be added in amounts from about 0.1% to about 2% by weight of the total reaction mixture and preferably in amounts from about 0.25 to about 1%. Light stabilizers such as 2-alkyl-2,3,4-benzotriazole may also be incorporated into the polymerization mass. Suitable chain transfer agents include sulfhydryl compounds, e.g., dodecylmercaptan and 2-mercaptoethanol. Preferred are alkyl mercaptans having from about 8 to 20 carbon atoms per molecule or mixtures of these which can be added to the reaction mixture in amounts from about 0.0005 up to about 1% weight of the total composition. The preferred concentration of mercaptan is from about 0.015 to about 0.05 weight percent. The polymerization may be carried out in the presence of small amounts of other compounds which are known to be useful in preparing molding compositions. This includes low concentrations of lubricants or flow agents such as mineral oil of a viscosity in the range of about 100 to 500 SSU, paraffin wax, petrolatum, polybutenes and the like in concentrations up to about 10% by weight of the total mixture, preferably in amounts of about 1 to about 5 weight percent, for improving both the processing and molding characteristics of the polymer product.

As indicated earlier the enhanced strength attained in the interpolymers of this invention makes them of particular value in the production of formulations incorporating ignition retardant (IR) additives. The IR additives can be any of the well known flame retardants for thermoplastic polymers, including but not limited to chlorowax, haloorganophosphorous compounds, and inorganic fluoborates. The flame retardants can be a single material or a mixture of several materials. One type of flame retardant is the addition product of phosphorus, carboxylic, or sulfonic acids with a bicyclic phosphite disclosed in U.S. Pat. Nos. 3,789,091 and 3,849,368, which are incorporated herein by reference. Typical utilizable mixtures are disclosed in U.S. Pat. No. 3,635,866, which is incorporated herein by reference. Other utilizable phosphonate mixtures are disclosed in U.S. Pat. No. 4,144,387, which is incorporated herein by reference. Preferred materials are a mixture of a brominated diphenyl ether, suitably decabromodiphenyl ether, and antimony oxide. The amounts of flame retardant in the final composition can vary dependent upon the nature of the material used. Generally, they will be 1 to 50 percent, preferably 5 to 25 percent, based upon the weight of the total composition.

In some circumstances, it may be convenient or desirable to physically blend further thermoplastic elastomer into the interpolymer of this invention. This additional elastomer may be any of the thermoplastic polymers of this type described in detail above, and is preferably the same type of material as that forming component (b). The exact amount of thermoplastic elastomer incorporated at this stage will, of course, depend on the amount already introduced into the interpolymer. Preferably, the total amount of thermoplastic elastomer in the final composition is from about 4 to about 5% by weight of the total composition.

The invention is further illustrated by reference to the following Example, which is given for the purpose of illustration only and is not meant to limit the invention to the particular reactants and conditions described therein.

EXAMPLE

About 8% by weight of a polybutadiene homopolymer (either medium cis-content-Diene ® 55, or high cis-content-Taktene ® 1202; precise amount noted for each sample) was dissolved in p-methylstyrene, together with selected amounts of one of the following thermoplastic elastomeric styrene/butadiene block copolymers:

(i) a radial SB block copolymer, namely Kraton ® 1184 which has 35% styrene, (ii) a linear SBS triblock copolymer, namely Kraton 1101 which has 30% styrene, (iii) a linear S-EB-S triblock copolymer having a hydrogenated midblock, namely Kraton G-1651 which has 35% styrene. Batch polymerization was then effected with stirring by maintaining the temperature in the range of 115°–117° C. until about 30% of the p-methyl styrene was converted to polymer. This prepolymerizate was then transferred to a glass jar equipped with a reflux condenser and converted to high impact p-methylstyrene interpolymer by heating on a sand bath using the following temperature cycle:

| Time (hours) | 1½–5½ | 5½–13 |
|---|---|---|
| Temp. (°C.) | 140 | linear rise 140–220. |

The finished polymer was removed from the glass jars and milled for 6 minutes at 210° C. to remove volatiles. For selected samples, this product was then physically blended (milled) with ignition retardant additives (9.45% decabromodiphenyl oxide +2.95% antimony oxide as a 70% concentrate in polystyrene) and selected amounts of Kraton 1101 or 1184 rubber. Impact strength measurements were made on compression molded samples, and the results are set out in Table 1 below.

In this Table, samples 1 through 7 are included for comparative purposes, and the final column, titled "Rubber/Izod Efficiency" records the incremental Izod improvement (in ft-lbs/in notch per 1% of rubber added) as determined from the slope of a graphical representation of Izod against rubber content.

From the results in Table 1, it is clearly apparent that: (i) the incorporation of Kraton block copolymer by interpolymerization results in a significantly greater increase in impact strength and Rubber/Izod Efficiency than when the same amount of the same elastomer is incorporated by post-polymerization mill blending, and also that (ii) interpolymerization of p-methylstyrene with 4% of Kraton TR block copolymer in addition to 7.6% Diene 55 results in an increase in impact strength and Rubber/Izod Efficiency significantly greater than that attained by using Diene 55 alone at a level as high as 13% (which represents a significantly higher total elastomer content, since Kraton 1184 contains only 65% elastomer (see above), and therefore 7.6% Diene 55+K-1184 corresponds to only 10.2% total elastomer).

TABLE 1

| Sample | Elastomers Interpolymerized with p-methylstyrene | | TR milled into Interpolymer | | Ignition Retardants | Izod Impact Strength (ft-lb/in. of notch) | Rubber/Izod Efficiency |
|---|---|---|---|---|---|---|---|
| | Polybutadiene | Thermoplastic (TR) | | | | | |
| 1 | Diene 55 8% | — | — | | — | 1.05 | — |
| 2 | Diene 55 13% | — | — | | — | 1.51 | — |
| 3 | Diene 55 8% | — | K-1101 | 5% | — | 1.28 | 0.06 |
| 4 | Diene 55 8% | — | K-1184 | 3% | — | 1.25 | |
| 5 | Diene 55 8% | — | K-1184 | 5% | — | 1.42 | } = 0.11 |
| 6 | Diene 55 8% | — | K-1184 | 7% | — | 1.63 | |
| 7 | Taktene 1202 8% | — | — | | — | 1.61 | } = 0.17 |
| 8 | Taktene 1202 7.6% | K-1184 | 5% | | | 2.45 | |
| 9 | Diene 55 7.6% | K-1101 | 5% | | — | 1.98 | 0.18 |
| 10 | Diene 55 7.7% | K-1184 | 3% | | — | 1.35 | |
| 11 | Diene 55 7.7% | K-1184 | 4% | | — | 1.92 | } = 0.18 |
| 12 | Diene 55 7.6% | K-1184 | 5% | | — | 1.98 | |
| 13 | Diene 55 7.8% | G-1651 | 4% | | — | 2.09 | |
| 14 | Diene 55 7.6% | K-1184 | 5% | — | Yes | 1.22 | |
| 15 | Diene 55 7.6% | K-1184 | 5% | K-1184 2% | Yes | 1.49 | } = 0.12 |
| 16 | Diene 55 7.6% | K-1184 | 5% | K-1184 4% | Yes | 1.72 | |
| 17 | Taktene 1202 7.6% | K-1184 | 5% | — | Yes | 1.43 | |

COMPARATIVE EXAMPLE

A series of experiments was carried out comparable to those described above, except that the styrenic monomer was styrene, in place of p-methylstyrene. The results obtained are set out in Table 2 below. Referring to that Table, Samples 1 through 5 were obtained by mill blending the thermoplastic radial block copolymer Kraton 1184 into a HIPS containing 7.5% of Diene 55; samples 6 through 12 were obtained by interpolymerizing styrene with K 1184 or the triblock K 1101, and with 7.5% Diene 55.

From the results in Table 2 it is clearly apparent that the same rubber/Izod efficiency is obtained irrespective of whether the rubber is interpolymerized or post-blended. The absolute Izod values in the two sets of experiments are not directly comparable, since the basestock was not the same; hence, the comparison between the different procedures is most readily seen from the Rubber/Izod Efficiency figures.

TABLE 2

| Sample | Thermoplastic Rubber (TR) Interpolymerized | | TR milled into HIPS | | Izod Impact Strength (ft-lb/in. of notch) | Rubber Izod Efficiency |
|---|---|---|---|---|---|---|
| 1 | None | | None | | 1.22 | |
| 2 | None | | K-1184 | 2% | 1.33 | |
| 3 | None | | K-1184 | 3% | 1.41 | |
| 4 | None | | K-1184 | 5% | 1.68 | 0.15 |
| 5 | None | | K-1184 | 7% | 2.10 | |
| 6 | None | | None | | 1.60 | |
| 7 | K-1184 | 2% | None | | 1.75 | |
| 8 | K-1184 | 3% | None | | 1.75 | 0.15 |
| 9 | K-1184 | 4% | None | | 2.02 | |
| 10 | K-1184 | 5% | None | | 2.01 | |
| 11 | K-1101 | 2% | None | | 1.73 | 0.14 |
| 12 | K-1101 | 4% | None | | 2.01 | |

What is claimed is:

1. A process for preparing an impact improved styrenic polymer which comprises:
    (a) thermally polymerizing a solution of (i) a thermoplastic elastomeric block copolymer and (ii) a non-thermoplastic diene elastomer dissolved in (iii) a monomer feed in which the sole polymerizable monomer component essentially of p-methylstyrene, the weight proportions of elastomers (i) and (ii) to monomer (iii) being about 3 to about 25 parts elastomers (i) and (ii) in, respectively, about 97 to about 75 parts monomer (iii), at a temperature in the range of from about 90° C. to about 200° C., with agitation until the reaction mixture has undergone phase inversion, for a time sufficient to polymerize substantially all of the p-methylstyrene;
    (b) removing any residual monomer, to yield an interpolymer containing discrete gelled rubber particles.

2. Process as claimed in claim 1 wherein the thermoplastic elastomeric block copolymer (i) is a radial block copolymer.

3. Process as claimed in claim 2 wherein the thermoplastic elastomeric radial block copolymer (i) is a radial polystyrene/polybutadiene block copolymer.

4. Process as claimed in claim 1 wherein the non-thermoplastic diene elastomer (ii) is polybutadiene.

5. Process as claimed in claim 1 wherein the interpolymer product is post-blended with from about 1 to about 5% by weight of thermoplastic block copolymer.

6. A process for the preparation of an ignition retardant, impact improved styrenic polymer which comprises blending an interpolymer produced by the process defined in claim 1 with from about 1 to about 50% by weight based on the total composition of an ignition retardant additive mixture of brominated diphenyl ether and antimony oxide, and optionally also up to about 5% by weight of thermoplastic elastomer.

* * * * *